United States Patent [19]

Saruta et al.

[11] Patent Number: 4,846,772
[45] Date of Patent: Jul. 11, 1989

[54] DRIVING ROPE

[75] Inventors: Minoru Saruta, Kishiwada; Munechika Matsumoto, Osaka, both of Japan

[73] Assignee: Asahi Mini Rope Hanbai Kabushiki Kaisha, Nagoya, Japan

[21] Appl. No.: 248,238

[22] Filed: Sep. 19, 1988

Related U.S. Application Data

[63] Continuation-in-part of Ser. No. 34,825, Apr. 6, 1987, abandoned.

[30] Foreign Application Priority Data

Apr. 18, 1986 [JP] Japan .................................. 61-90279

[51] Int. Cl.⁴ ............................................... F16G 1/08
[52] U.S. Cl. ........................................ 474/271; 74/37; 156/180; 428/377; 474/153
[58] Field of Search ............... 474/271, 268, 202, 204, 474/205, 153; 101/111; 74/501 R, 37, 89.2; 156/180; 428/377

[56] References Cited

U.S. PATENT DOCUMENTS 1,983,962 12/1934 Barber et al. ................... 474/153 X
4,026,162 5/1977 Berg ................................. 474/205

Primary Examiner—Thuy M. Bui
Attorney, Agent, or Firm—Jordan and Hamburg

[57] ABSTRACT

A driving rope for use with the printing head carriage of a word processor, a plotter or other compact equipment. The driving rope generally comprises a core rope and a thread formation of resin disposed thereon. Unlike a conventional timing belt, this driving rope is deformable for easy routing and yet assures a positive and accurate shift of the carriage.

3 Claims, 2 Drawing Sheets

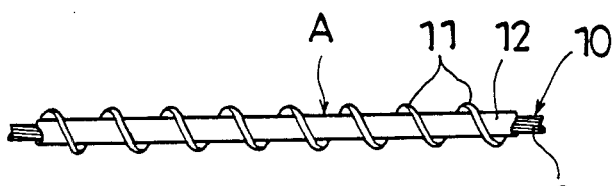
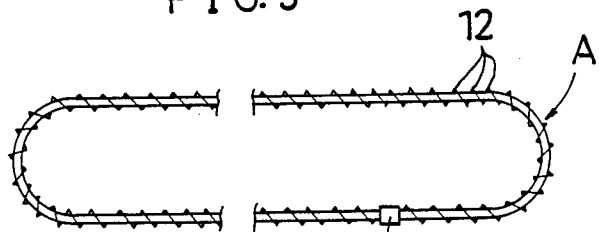
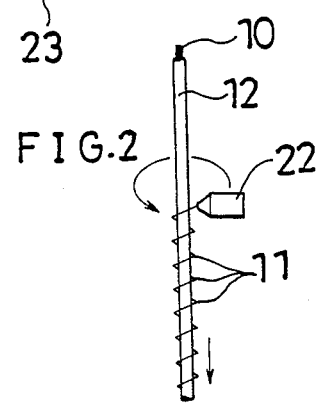
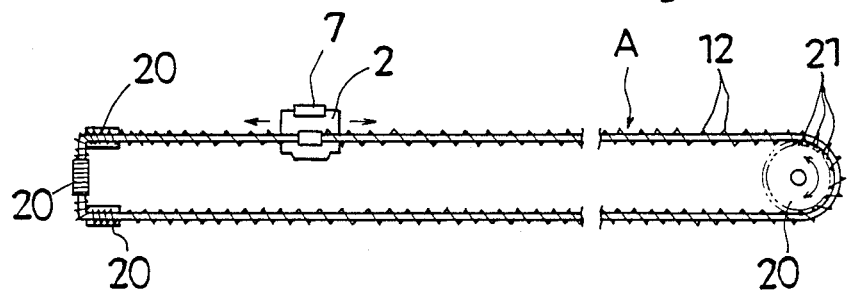

DRIVING ROPE

This application is a continuation-in-part of application Ser. No. 034,825, filed Apr. 6, 1987, now abandoned.

BACKGROUND OF THE INVENTION

1. Field of the Invention

The present invention generally relates to driving ropes. More particularly, the invention relates to a driving rope for use in shifting a printer carriage shifting, for example, a carriage for a printer or plotter in a word processor, or a mirror or a lens in a xerographer.

2. Description of the Prior Art

For shifting the printing head of a printer, plotter or the like, it is customary to employ a timing belt, i.e. an endless belt, such as a V belt formed with internal rack-teeth or a wire rope consisting of a plurality of bare metal wires twisted together.

In the system using a timing belt, which is illustrated in FIG. 5, a carriage 2 is attached to a timing belt 1 which is thrown over a pair of sprockets 3,3 installed with an appropriate spacing, with teeth 1a on the inner surface of said timing belt 1 being engaged with teeth 3a of said sprockets 3,3, so that the rotation of the sprockets 3 is transmitted to the timing belt 1. To shift the carriage 2 in this arrangement, the above-mentioned sprockets 3,3 are rotated to drive the timing belt 1. Here, the accuracy of carriage shift is assured by the positive engagement of teeth 1a of the timing belt 1 with teeth 3a of the sprockets 3,3.

However, since a timing belt 1 of this type cannot be easily twisted or otherwise deformed, the system is of necessity bulky and cannot be used for a compact printer built into a personal word processor or the like. It is also difficult to apply this system to a plotter or the like which demands a complicated motion of the carriage. Furthermore, since a timing belt 1 of this type is fixed in length and in the arrangement of inner teeth 1a, it can be applied to printers of a given specification only, thus lacking in universality.

On the other hand, when a wire rope is used as a drive means for shifting the carriage, the flexibility of the wire rope does not cause the above-mentioned problems with a timing belt, for as shown in FIG. 6, a wire rope 4 can be easily routed and thrown over pulleys 5,5 in a desired manner.

However, when the pulleys 5,5 are driven in such an arrangement, the wire rope 4 tends to slip so that the carriage cannot be accurately shifted.

To prevent the idle rotation of the pulleys 5,5, it has been proposed to secure both ends of a wire rope 4 to a drive bobbin 6 and wind the wire rope a few turns on the drive bobbin 6. In this system, as the drive bobbin 6 is driven, the wire rope 4 is paid out and taken up to shift the carriage 2.

However, it is troublesome to secure both ends of the wire rope 4 to the drive bobbin 6 and wind the wire rope a few turns on the bobbin. It is also a delicate work to adjust the tension of the wire rope.

Furthermore, even in the above arrangement, the tension of the wire rope 4 varies between the case in which the printing head 7 mounted on the carriage 2 is printing and the case in which it is not, and in winding the wire rope 4 on the drive bobbin 6, the winding position of the rope 4 tends to vary or one turn of the wire rope 4 tends to lie over another so that the accuracy of carriage shift is adversely affected to cause a variation in printing position.

OBJECTS OF THE INVENTION

It is an object of the invention to provide a driving rope which assures a positive and accurate shift of a carriage.

It is another object of the invention to provide a driving rope which is suitable for use with the printing head carriage of a personal word processor or the like.

SUMMARY OF THE INVENTION

The driving rope according to the present invention comprises a core rope and a thread formation of resin spirally provided on said core rope.

When a core rope with a poor bonding affinity for resin, such as a wire rope, is employed, the surface of the rope 10 is previously coated with the resin 12 and, the thread formation 11 is then provided.

Since the driving rope according to the present invention consists of a core rope 10 and a thread formation of resin 11 formed thereon, it can be used in various states, by twisting or the like, just like the conventional wire rope.

When the rope 10 is thrown over sprockets 20 with its thread formation 11 engaged with sprocket teeth 21 like the conventional timing belt and one of the sprockets is driven, the rotation of the sprockets 20 is transmitted to the driving rope to shift the carriage 2.

Thus, unlike the timing belt which is dimensionally rigid, the driving rope according to the present invention can be applied to the small-sized printer which is built into a compact word processor or the like and can also be applied to a plotter which calls for a complicated motion of the carriage.

Since the driving rope according to the invention can be installed with its thread formation engaged with teeth of sprockets, it is not necessary to take the troublesome procedure of fixing both ends to a drive bobbin and wind it a few turns on the bobbin to prevent slippage. Moreover, variation in the winding position of the conventional wire rope on the drive bobbin and the consequent inaccuracy of shift of the carriage are liminated. Thus, as the thread formation is securely engaged by the sprocket teeth, the carriage is shifted accurately and, hence, printing is done in correct position.

BRIEF DESCRIPTION OF THE DRAWINGS

Referring to FIGS. 1 to 4 which illustrate preferred embodiments of the present invention, FIG. 1 is a partially exploded front view showing a driving rope as a preferred embodiment of the invention;

FIG. 2 is a front view showing the method of manufacturing a driving rope of the invention;

FIG. 3 a front view showing an endless drive rope;

FIG. 4 is a front view showing the driving rope as installed; and

FIG. 4A is a front view showing another embodiment of a driving rope of the invention, FIG. 4A being on a larger scale than FIG. 4.

FIG. 5 a front view showing a carriage drive system using a timing belt; and

FIG. 6 is a front view showing a carriage drive system using a wire rope.

DETAILED DESCRIPTION AND PREFERRED EMBODIMENTS

Figure 5:
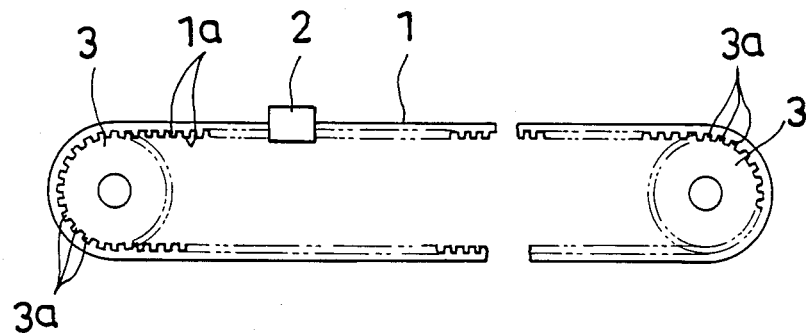
In FIGS. 5 and 6 which illustrate the prior art technologies.
Figure 6:
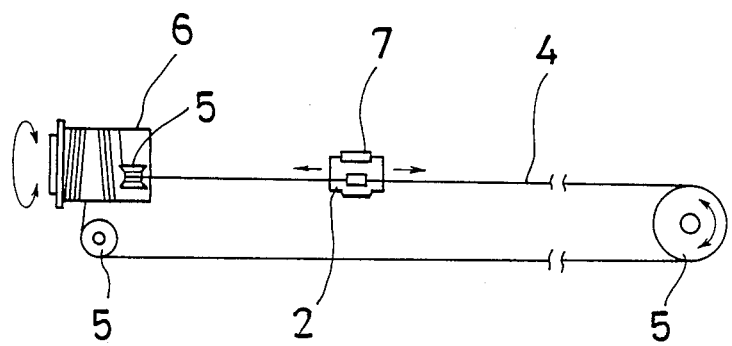

Preferred embodiments of the present invention are described below, reference being had to FIGS. 1 to 4.

As shown in FIG. 1, a driving rope A comprises a core rope 10 consisting of a multiplicity of bare metal wires 10a of stainless steel twisted together, a resin film 12 covering the surface of said core rope 10, and a spiral thread formation 11 formed on said resin film 12.

For use as a carriage drive means for a compact printer, for instance, the core rope 10 generally has a diameter of 0.3 to 0.6 mm so that it can be freely twisted or otherwise deformed.

The resin to be used for the formation of said resin film 12 on the surface of core rope 10 and the formation of said thread formation 11 is preferably a synthetic resin which does not detract from the flexibility of the core rope 10 and is satisfactory in bond strength and abrasion resistance. Generally, a polyurethane resin or a polyamide resin is preferred.

In particular, it is preferable to formulate the resin film 12 of polyamide resin and the thread formation 11 of polyurethane resin to assure adequate bond strength between the core rope 10 and the resin film 12 and between the resin film 12 and the thread formation 11.

It is further preferable that the thickness of the resin film 12 be 0.05 to 0.1 mm and the height of the thread formation 11 be 0.4 to 0.8 mm, and the axial pitch of the thread formation 11 be 2.0 to 4.0 mm. If the thread height is less than 0.4 mm, meshing between the sprockets and the driving rope A will not be secure and thus slippage will occur. If the thread height is more than 0.8 mm, the driving rope A will be bulky and of decreased flexibility so that it cannot be used in small apparatus.

In manufacturing this driving rope, the core rope 10 is coated with the resin 12 and, then, fed out at a constant rate. By means of an injection nozzle 22 adapted to spin around the core rope 10 in a fixed location, a resin composition is continuously sprayed onto the resin-clad core rope 10 to produce a spiral thread formation on the rope 10. However, the driving rope according to the present invention can be manufactured by other techniques as well. Thus, for example, it is possible to separately manufacture a ribbon of resin having a width of 0.4 to 0.8 mm (corresponding to the height of the thread formation) that is to constitute such a thread formation 11 and wind it around the resin-clad core rope 10 fed out as above and further coated by adhesive. It is also possible to carry out the coating of the core rope 10 with resin 12 and the formation of the thread formation 11 simultaneously in one operation.

While the core rope 10 is a wire rope in the above example, other rope materials can also be employed.

Thus, for example, polyimide and other resin ropes which are flexible, high in tensile strength, not stretchable, and durable and resistant to repeated fatigue can be successfully employed.

When the thread-forming resin has a good bonding affinity for the core rope 10, it is not necessary to previously coat the core rope 10 with a resin 12. In this case (see FIG. 4A), there is to be used a core rope having a diameter of 0.4 to 0.8 mm, which is freely twistable or otherwise deformable so that it can be used as a carriage drive means for a compact printer, for instance, like the above described resin-clad core rope of 0.3 to 0.6 mm diameter.

The mode of shifting a compact printer carriage having a printing head mounted thereon using the drive rope A according to the present invention is described below. First, the driving rope A is cut to a length suited to the location of installation and both ends of the cut rope A are jointed with a connector 23 to form a loop. A carriage 2 is then attached to the loop in an appropriate position. Alternatively, both ends of the cut rope A are secured to the carriage 2 so as to form an endless loop with the interposition of the carriage 2.

Then, as shown in FIG. 4, the endless driving rope A carrying the carriage 2 is thrown over sprockets 20 with its thread formation 11 engaged with teeth 21 of the sprockets 20.

To shift the carriage, one of the sprockets on which the driving rope A has been thrown is driven so that the rotation of the sprockets is transmitted to the thread formation 11 and the rope A whereby the carriage on which the printing head 7 is mounted is shifted.

While a few preferred embodiments of the present invention have been described, it should be understood that many changes and modifications may be made by one skilled in the art without departing from the spirit of the invention.

What is claimed is:

1. A driving rope comprising a core rope having a diameter of 0.3 to 0.6 mm and a resin cladding with a thickness of 0.05 to 0.1 mm, and a thread formation of resin provided on said core rope and having a height of 0.4 to 0.8 mm, said thread formation including an elongated member extending helically on said core rope.

2. A driving rope according to claim 1, wherein said resin cladding is formulated of polyamide resin and said thread formation of polyurethane resin.

3. A driving rope comprising a core rope having a diameter of 0.4 to 0.8 mm and a thread formation of resin provided on said core rope and having a height of 0.4 to 0.8 mm, said thread formation including an elongated member extending helically on said core rope.

* * * * *